United States Patent Office 3,557,064
Patented Jan. 19, 1971

3,557,064
VULCANIZABLE COMPOSITION
Douglas Cameron Edwards, Sarnia, Ontario, Canada, and Peter Noel Lewis, Ithaca, N.Y., assignors to Polymer Corporation Limited, Sarnia, Ontario, Canada, a body corporate and body politic
No Drawing. Filed Feb. 11, 1969, Ser. No. 798,442
Claims priority, application Canada, Feb. 22, 1968, 013,077
Int. Cl. C08f 27/08
U.S. Cl. 260—78.4
7 Claims

ABSTRACT OF THE DISCLOSURE

A solid vulcanizate is prepared from a mixture of (1) a liquid polymer of a conjugated diolefin containing more than one active halogen atom per polymeric molecule and (2) a polyamine salt of a polycarboxylic acid by heating it at a temperature above the decomposition temperature of said salt.

The mixture which is storable at room temperature is suitable for use as premixed and curable sealants.

This invention relates to vulcanization of liquid halogenated polymers of olefinically unsaturated monomers.

Liquid polymers of $C_4$–$C_8$ diolefins containing about 2 allylic halide groups per molecule, such as described in French Pat. 1,488,811, have been vulcanized with polyfunctional amines.

The above polymers are very reactive and liquid compositions based thereon, when mixed with polyfunctional organic amines, set up to non-pourable masses within periods which range from less than an hour to several days. Generally speaking, polyfunctional amines which do not contain elements other than carbon, hydrogen and nitrogen, exhibit room temperature vulcanization within periods ranging from a few minutes to a few days.

For certain purposes, it is desirable to delay or totally inhibit the room temperature vulcanization, while preserving the ability to effect vulcanization of the composition at elevated temperatures. In particular, it is often desirable to prepare compositions which can be stored for extended periods at room temperature without vulcanization but which vulcanize on heating to form non-porous, elastic products.

In the prior art, room temperature vulcanization has been inhibited by the use of amines in the form of acid salts of strong acids, for example, amine hydrochlorides, and vulcanization has been effected when desired by exposure to moisture. Acid salts have also been used to prepare room temperature storable compositions which, upon heating, release the free amine in conjunction with gaseous products so as to prepare vulcanized foams or sponges.

It is an object of this invention to provide a process whereby room temperature storable compositions may be vulcanized by the agency of heat alone to provide nonporous elastic products.

This invention provides a process of vulcanizing a liquid polymer of an olefinically unsaturated compound, said polymer containing more than one active halogen atom per molecule, which comprises mixing a minor proportion of a polyamine salt of a polycarboxylic acid and a major proportion of said liquid polymer, said mixing being carried out at a temperature below the decomposition temperature of said polyamine salt, and heating the resulting mixture at a temperature above the decomposition temperature of said polyamine salt, whereby said liquid polymer vulcanizes to form a solid vulcanizate.

In this specification, liquid polymers are defined broadly as pourable polymers; such polymers are non-volatile and generally have intrinsic viscosities of not more than about 1.0 dl./g. in toluene at 30° C.; and vulcanizates are the solid reaction products of the liquid polymer with compounds which are capable of linking molecules of the liquid polymers.

The liquid polymer that can be used in the process of this invention is a non-volatile material having a molecular weight above 1000 and preferably at least 2000. Above this lower limit, the molecular weight may vary widely. although it is desirable that the polymer is liquid and pourable, preferably at room temperature. The preferred liquid polymer has a bulk viscosity of not more than about 5000 poise at 25° C. However, it is within the scope of this invention to use higher molecular weight polymer, the bulk viscosity of which has been reduced to the desired level with a compatible oil.

The liquid polymer is characterized by the presence of more than one active halogen atom per molecule in the majority of the molecules. The preferred active halogens are in the form of allylic halide groups having the formula

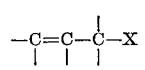

in which X is a halogen atom. The halogen atom may be selected from chlorine, bromine or iodine, although best results are obtained with liquid polymers having allylic bromide groups. It is preferred that the allylic halide groups are attached to the polymeric molecules in terminal positions, i.e. at the ends of linear chain molecules and, if the molecules are branched, at the end of branches. However, the presence of allylic halide groups in the middle portions of the chain molecules is not detrimental. The polymer is an addition polymer such as may be prepared by a free radical polymerization of olefinically unsaturated hydrocarbon compounds. It may be a homopolymer or a copolymer of two or more polymerizable compounds. Olefinically unsaturated hydrocarbons are the preferred compounds, although a small proportion of the polymerizable compounds may contain oxygen, nitrogen and/or chlorine atoms. The preferred liquid polymers used in this invention are polymers of diolefinic hydrocarbons containing 4–8 carbon atoms such as butadiene-1,3, isoprene, 2,3-di-methylbutadiene-1,3, pentadiene-1,3, and best results are obtained with polymers of butadiene-1,3 with or without a minor amount, e.g. 30% or less, of copolymerized vinyl compounds such as styrene, acrylonitrile, alkyl acrylate and others. Depending on the molecular weight of the liquid polymer, number of the allylic halide groups and type of the halogen atom, the halogen content of the liquid polymer falls within the range of 1–15 weight percent and preferably within the range of 1.5–10 weight percent.

The liquid polymer suitable for use according to this invention may be prepared by various processes. One of such processes is a direct polymerization of monomers in the presence of halogen-containing modifiers such as described in French Pat. 1,488,811. It is also possible to produce such liquid polymers by a halogenation of unsaturated polymers under conditions such that more than one allylic halide group is produced in a polymeric molecule.

The amine salt used in accordance with this invention is a salt of a polyamine and a polycarboxylic acid. It preferably is a compound which is stable at temperatures of up to about 50° C. The salt is judged to be stable when it does not produce red or brown coloration upon mixing with a solution of chloranil in dioxane. The color indicates the presence of free amine. At temperatures between about 50° C. and 160° C., the salt decomposes into constituents, that is, free polyamine and polycarboxylic acid. The salt may be preformed by reacting both components at a temperature of about 10–40° C., preferably in a solvent such as water or acetone. In an organic solvent, the salt is insoluble and precipitates in the form of a white powder that may be purified if desired.

The polyamine used for the salt formation may be an aliphatic, cycloaliphatic, aromatic or heterocyclic polyamine, preferably containing two to five amine groups. Representative examples of such polyamines are hexamethylene diamine, diethylene triamine, triethylene tetramine, tetraethylene pentamine and other polyalkylene polyamines, hexamethylene tetramine, piperazine, 1,3-di-4-pyridyl propane, dipicolyl amine, dipyridyl amine, polyaziridinyl compounds and other heterocyclic polyamines. The amine groups in these polyamines may be primary, secondary or tertiary. Primary and secondary amine groups are preferred in the aliphatic polyamines since they are capable of forming stable isolatable salts more readily than sterically hindered tertiary amines. However, in heterocyclic polyamines, tertiary amine groups are satisfactory salt formers with polycarboxylic acids.

The polycarboxylic acid used for the salt formation is a hydrocarbyl polycarboxylic acid containing two or more carboxylic groups. These groups are preferably separated by at least one carbon atom. The hydrocarbyl radical carrying two or more carboxylic groups is an aliphatic or aromatic radical containing 1 to 30, preferably 2–10 carbon atoms and preferably is selected from saturated hydrocarbyls and halogen substituted hydrocarbyls. Saturated hydrocarbyls are preferred, although olefinically unsaturated hydrocarbyls may also be used. The hydroxy substituted hydrocarbyl radicals such as in tartaric acid are not suitable since they decompose into water and other volatile products at temperatures below 160° C. Representative examples of acids that can be used for the reaction with polyamines are malonic, succinic, glutaric, adipic, pimelic, fumaric, phthalic, aconitic and 1,2,3-propane tricarboxylic acid. Polyamine and polycarboxylic acid are reacted in equimolar proportions to prepare neutral salts or in proportions showing an excess of the acid to prepare acidic salts. The preferred salt is a salt of a heterocyclic polyamine such as 1,3-di-4-dipyridyl propane with dicarboxylic acids containing 4–8 carbon atoms such as succinic or adipic acid. If desired, the salt may be formed in situ by first mixing the acid with the liquid polymer and then adding the amine.

In accordance with this invention, the amine salt is used in a minor amount to the major amount of the liquid polymer. It is preferred to use about 0.5 to 15 parts by weight of amine present in the amine salt per 100 parts by weight of polymer, although the most preferred range is about 1 to 5 parts.

The liquid polymer may be mixed with the amine salt in the presence of compounding ingredients such as fillers, tackifying resins, plasticizers, antioxidants and other conventional materials. Examples of fillers include carbon black, silica, clay, calcium carbonate, zinc oxide. Tackifying resins include natural abietic acid based resins and synthetic thermoplastic or thermosetting resins such as phenol formaldehyde resins, polyterpenes, coumarone-indene resins, epoxy resins. Suitable plasticizers include paraffinic and naphthenic oils, esters and chlorinated polyphenyls. If desired, the bulk viscosity of the mixture may be increased by the addition of high molecular weight polymers such as polyethylene, polypropylene, ethylene-propylene copolymers, ethylene-vinyl acetate copolymers or trans-1,4 polyidene.

The mixture can be prepared at a temperature below the decomposition temperature of the polyamine salt, e.g. not more than 50° C., and stored at room temperature or thereabout for an extended period of time without development of elastic properties. This period, which ranges from about a week to one month, may be further extended for about 6 months by the addition of a small amount of a solid desiccant. Desiccants capable of absorbing large amounts of water and holding them tightly by chemical bonds are preferred. The preferred desiccant is calcium oxide, although other drying agents such as barium oxide, magnesium oxide, calcium sulfate can also be advantageously used.

The cure of the pourable composition can be induced by heating it at a temperature between about 50° C. and 160° C. The temperature of curing depends on the thermal stability of the particular amine salt, that is, on the availability and activity of the polyamine released from the salt. Optimum temperature range for the preferred amine salts is about 100–150° C. at which range the vulcanization proceeds at a reasonably fast rate and solid vulcanizates are obtained which are non-porous and have good physical properties.

The compositions are suitable for use as sealants, adhesives and binders which can be conveniently premixed, transported and applied on site when required.

The following examples will further illustrate the invention. In these examples, the liquid polymer was a homopolymer of butadiene produced by the process of French Pat. 1,488,811. The polymer was a viscous liquid having an intrinsic viscosity of 0.26 deciliter/gram, measured in toluene at 30° C., and a combined bromine content of 4.7 weight percent. About half of this bromine was in the form of allylic bromide groups as determined by analyzing nuclear magnetic resonance spectra.

EXAMPLE I

The liquid polymer of butadiene as described above was mixed with an amine salt of dipyridyl propane and succinic acid and tested for pot life at room temperature and vulcanizability at elevated temperature.

The salt was prepared in acetone solution by reacting equimolar amounts of 1,3-di-4-pyridyl propane and succinic acid. The solution was evaporated to dryness at room temperature to yield a salt having a melting point of about 158° C. A 50% suspension of the above salt in petroleum jelly was made and used in compounding.

Three compounds were made using the following recipe:

| | Parts by wt. |
|---|---|
| Liquid polybutadiene | 100 |
| Calcium oxide | 5 |
| Dibasic lead phosphite | 5 |
| Amine salt, variable. | |

The ingredients were mixed by hand to a uniform liquid mixture.

The mixtures were placed in a mould and heated under pressure for one hour at 122° C. Non-porous solid vulcanizates, free of gas bubbles, were obtained and tested for physical properties using an Instron tester. The results are shown in Table I.

TABLE I

| | Compound | | |
|---|---|---|---|
| | A | B | C |
| Amine salt [1] | 2.3 | 3.3 | 3.9 |
| Tensile strength, kg./cm.$^2$ | 16.2 | 24.0 | 20.1 |
| Elongation, percent | 680 | 740 | 710 |
| 100% modulus, kg./cm.$^2$ | 5.5 | 7.5 | 7.0 |
| 300% modulus, kg./cm.$^2$ | 8.2 | 11.2 | 10.2 |

[1] Parts per 100 parts of polybutadiene.

An additional compound (Compound D) was made and used for the determination of pot life. This compound was similar to those shown in Table I except that a higher amount of amine salt of 5 parts/100 parts of polybutadiene was used. It was stored for 11 days at a temperature of about 25° C. and a humidity of about 50%. The initial bulk viscosity of Compound D, measured at 25° C. using a Brookfield viscometer equipped with a TF Spindle, was 750 poise. Samples taken from this compound at different intervals (3, 5, 7 and 11 days of storing) all showed the same viscosity of 750 poise. The rest of Compound D remained pourable after two months of shelf storing.

EXAMPLE II

The liquid polybutadiene of Example I was vulcanized in the presence of two different amine salts. The first salt, produced by reacting in acetone solution 1 mole of 1,3-di-4-pyridyl propane was 1.75 mole of oxalic acid, was a solid white substance stable at temperatures up to about 140° C. The second salt was produced by reacting 1,3-di-4-pyridyl propane and adipic acid equimolar amounts.

The polybutadiene was compounded using the following recipe:

|  | Compound | |
|---|---|---|
|  | E | F |
|  | Parts by weight | |
| Liquid polybutadiene | 100 | 100 |
| Amine salt | 15[1] | 28[2] |
| Calcium oxide | 2.5 |  |
| Dibasic lead phosphite | 5 |  |
| Epoxy resin [3] | 10 | 10 |

[1] Salt of 1,3-di-4-pyridyl propane and oxalic acid.
[2] Salt of 1,3-di-4-pyridyl propane and adipic acid.
[3] Diepoxy benzyl benzoate.

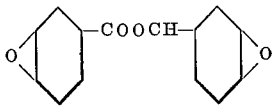

These two compounds were heated in a mould under pressure at a temperature of 149° C. for 45 minutes. Solid vulcanizates were obtained which were free of bubbles and when stretched showed good rubber elastic properties.

EXAMPLE III

The liquid polybutadiene was compounded as in Example I except that instead of a variable amount of the described amine salt, 5 parts of a different amine salt was used. This salt was prepared by reacting equimolar amounts of hexamethylene diamine and succinic acid. The compound was cured at 140° C. for 30 minutes and a solid rubber-like vulcanizate was obtained.

EXAMPLE IV

A pourable clay-filled compound was made by mixing a suspension of 25 parts by weight of a treated clay [1] and 5 parts by weight of calcium oxide in 100 parts by weight of the liquid polybutadiene of Example I with 10 parts by weight of the 50% suspension of the polyamine salt of Example I in petroleum jelly. The suspensions were prepared separately on a three-roll paint mill and stored in a desiccator prior to use; they were mixed under dry nitrogen using a spatula and glass plate and the mixture was kept at room temperature in a screw-cap jar.

After one week's storage, the mixture was examined and there was no evidence of vulcanization or increased

[1] Clay, having an average, particle size of 0.3 micron, treated with a small amount of an aminosilane.

viscosity. A portion was removed and press-cured between poly(tetrafluoroethylene) sheets for 80 minutes at 121° C. The cured sheet, tested for physical properties using the Instron tester showed a tensile strength of 39 kg./cm.$^2$, elongation of 550%, and a 300% modulus of 28 kg./cm.$^2$. The remainder of the compound, stored for an additional three weeks, was pourable with no evidence of cure or increased viscosity.

What is claimed is:

1. A process of vulcanizing a liquid polymer of an ethylenically unsaturated compound, said polymer containing a major proportion of molecules containing at least two active halogen atoms in terminal positions and being characterized by an intrinsic viscosity of not more than about 1.0 decilitres/gram measured in toluene at 30° C., which comprises mixing a minor proportion of a polyamine salt of a polycarboxylic acid and a major proportion of said liquid polymer, said mixing being carried out at a temperature below the decomposition temperature of said polyamine salt, and heating the resulting mixture at a temperature above the decomposition temperature of said polyamine salt, whereby said liquid polymer vulcanizes to form a solid vulcanizate.

2. The process of claim 1 in which the liquid polymer is a polymer of butadiene-1,3 containing polymerized units of butadiene in a major proportion.

3. The process of claim 1 in which the active halogen atoms are halogens of allylic halide groups selected from chlorine, bromine or iodine.

4. The process of claim 1 in which the polyamine salt is mixed in an amount of 0.5 to about 15 parts by weight of polyamine in said salt per 100 parts by weight of the liquid polymer.

5. The process of claim 1 in which the polyamine salt is a salt of an aliphatic or heterocyclic polyamine containing 2–5 amine groups.

6. The process of claim 1 in which the polycarboxylic acid in the polyamine salt is a hydrocarbyl polycarboxylic acid containing 2–3 carboxyl groups separated from each other by at least one carbon atom.

7. The process of claim 1 in which said mixing is carried out at a temperature below 50° C. and said heating is carried out at a temperature between about 50° C. and 160° C.

References Cited

UNITED STATES PATENTS 3,324,088   6/1967   Waldron _____ 260—79.3

FOREIGN PATENTS 1,488,811   6/1967   France.

JOSEPH L. SCHOFER, Primary Examiner

J. KIGHT III, Assistant Examiner

U.S. Cl. X.R.

260—83.3, 85.1, 94.7, 94.9, 890, 889